United States Patent [19]
Kao

[11] Patent Number: 5,678,458
[45] Date of Patent: Oct. 21, 1997

[54] JOINT STRUCTURE FOR BICYCLE HANDLEBAR ASSEMBLY

[76] Inventor: Yu-Ju Kao, 2, Alley 1, Lane 29, Sec. 2, Pei-Shin Rd., Shin-Tien City, Taipei Hsien, Taiwan

[21] Appl. No.: 589,067

[22] Filed: Jan. 23, 1996

[51] Int. Cl.$^6$ .................................................. B02K 21/12
[52] U.S. Cl. ........................ 74/551.3; 74/551.1; 280/279
[58] Field of Search .................... 74/551.1–551.8; 280/279

[56] References Cited

U.S. PATENT DOCUMENTS

| 5,273,302 | 12/1993 | Ureel | 280/279 |
| 5,400,676 | 3/1995 | Kao | 74/551.1 |
| 5,465,634 | 11/1995 | Chen | 74/551.1 X |
| 5,509,328 | 4/1996 | Lai | 74/551.3 |
| 5,570,614 | 11/1996 | Nastrucci | 74/551.1 |

FOREIGN PATENT DOCUMENTS

| 2682348 | 4/1993 | France | 74/551.1 |
| 3340893 | 5/1984 | Germany | 74/551.1 |
| 2531155 | 11/1948 | Switzerland | 74/551.1 |

Primary Examiner—Vinh T. Luong
Attorney, Agent, or Firm—Bacon & Thomas

[57] ABSTRACT

The handlebar stem and handlebar of a bicycle are secured together by a common joint having a joint seat defining a joint hole and an extension part having a half-cylindrical groove which is engageable by a cover having a corresponding half-cylindrical groove and a plurality of elliptical-shaped fastener holes. An open slot extends from the joint hole through the extension part for permitting the handlebar stem to be inserted through the joint hole and secured therein by a pair of fasteners. Similarly, the handlebar is disposed between the half-cylindrical grooves and secured in place by fasteners extending through the elliptical holes and the extension part.

1 Claim, 4 Drawing Sheets

JOINT STRUCTURE FOR BICYCLE HANDLEBAR ASSEMBLY

BACKGROUND OF THE INVENTION

1. Field of Invention

The present invention pertains to a joint for a handlebar stem and a handlebar a bicycle. The joint comprises a joint seat and an upper cap. The joint is especially characterized by a longitudinal open slot on the joint seat and a plurality of elliptical holes in the upper cap for fastening the handlebar stem and handlebar together.

2. Description of the Prior Art

A prior art joint for fastening a handlebar stem and handlebar together includes a C-shaped joint hole on one end of an extension part of an inverted L-shaped type of handlebar stem. Besides, there is another structure of prior art including a mutual joint tube which has a vertical hole and a horizontal hole on its two ends for fastening a handlebar stem vertically and a handlebar horizontally. Furthermore, a common structure currently utilized includes an inverted L-shaped type of handlebar stem. In this structure, an independent upper cap is set at the joint end of the handlebar to match with a cap having a half-circular groove on one end of the handlebar stem in order to fasten the handlebar.

SUMMARY OF THE INVENTION

The main purpose of the present invention is to provide a common joint for a handlebar stem and a handlebar of a bicycle and to fasten the handlebar stem and the handlebar together. The present invention comprises a joint seat and an upper cap. In particular, there is provided a longitudinal open slot passing through the side end of a half-cylindrical groove on one end of an extension part of the joint seat and through the inner wall of the handlebar stem joint hole. Screw bolts are used to contract the parts forming the open slot in order to fasten the handlebar stem. The upper cap covers the facial end of a half-cylindrical groove on one end of the extension part of the joint seat. Elliptical bolt holes on the upper cap match with bolt holes of the facial end of the half-cylindrical groove, and screw bolts are inserted into those bolt holes to fasten the handlebar. This joint structure is more simple and precise, eliminates material stress due to the longitudinal open slot, and is easily assembled to fasten the handlebar and handlebar stem securely.

DETAILED DESCRIPTION OF THE PREFERRED EMBODIMENTS

Figure 1:
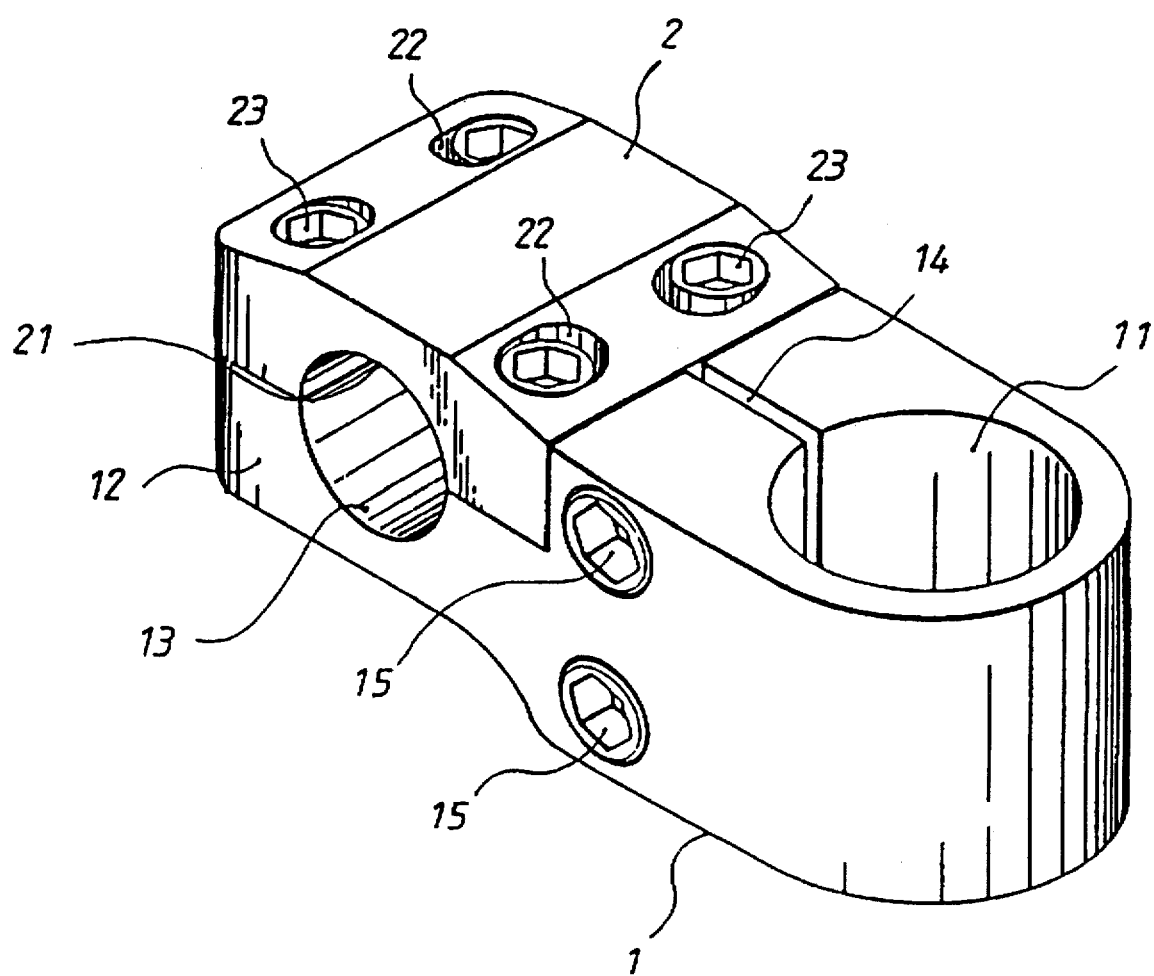
FIG. 1 is an assembled perspective view of a joint structure according to the present invention.
Figure 2:
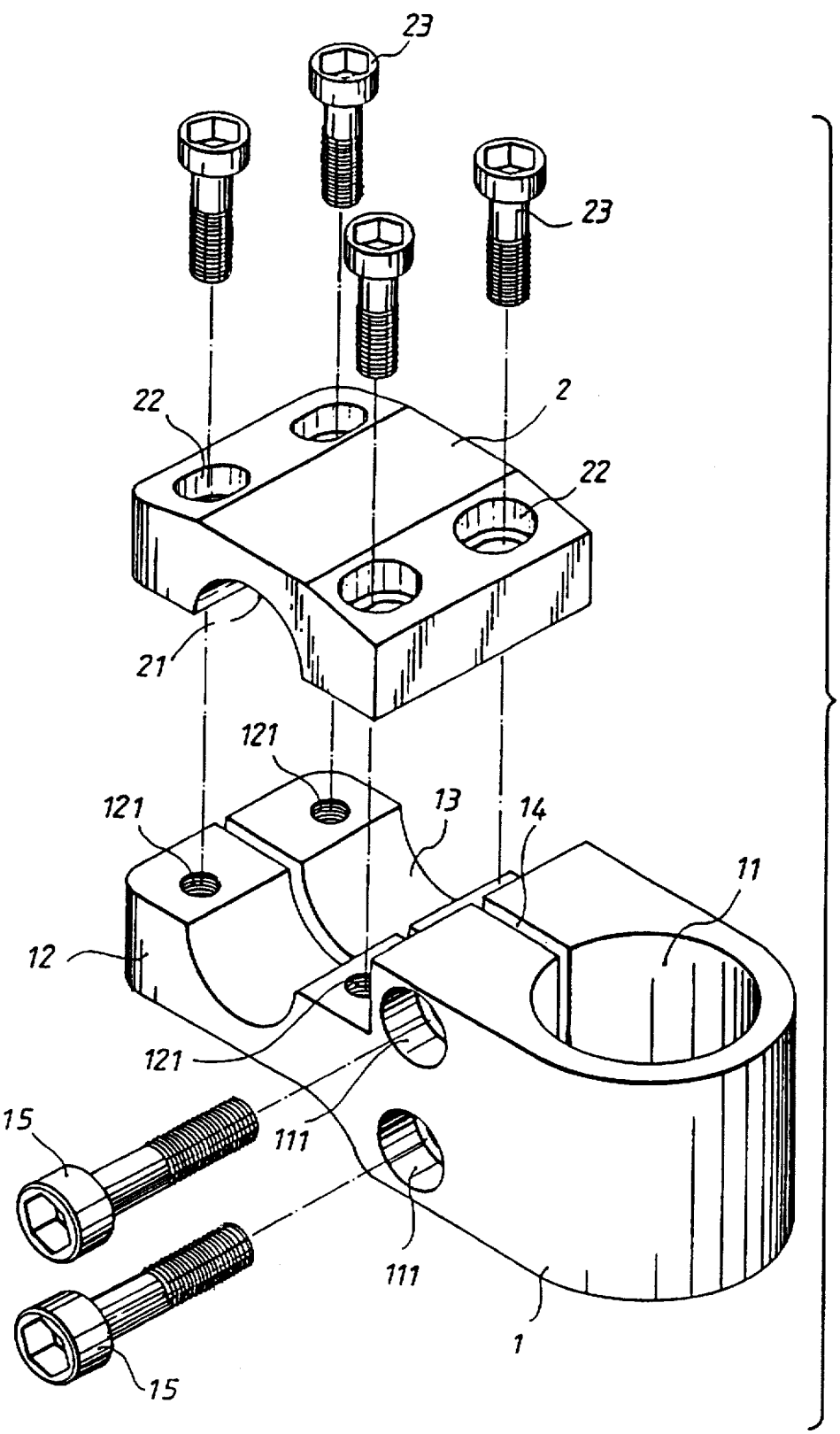
FIG. 2 is an exploded perspective view of the joint structure.

As shown in FIG. 1 and FIG. 2, the present invention comprises a joint seat 1 and an upper cap 2, both of which are used for providing a common joint for a handlebar stem and a handlebar of a bicycle, and to separately fasten the handlebar stem vertically and the handlebar horizontally.

Figure 3:
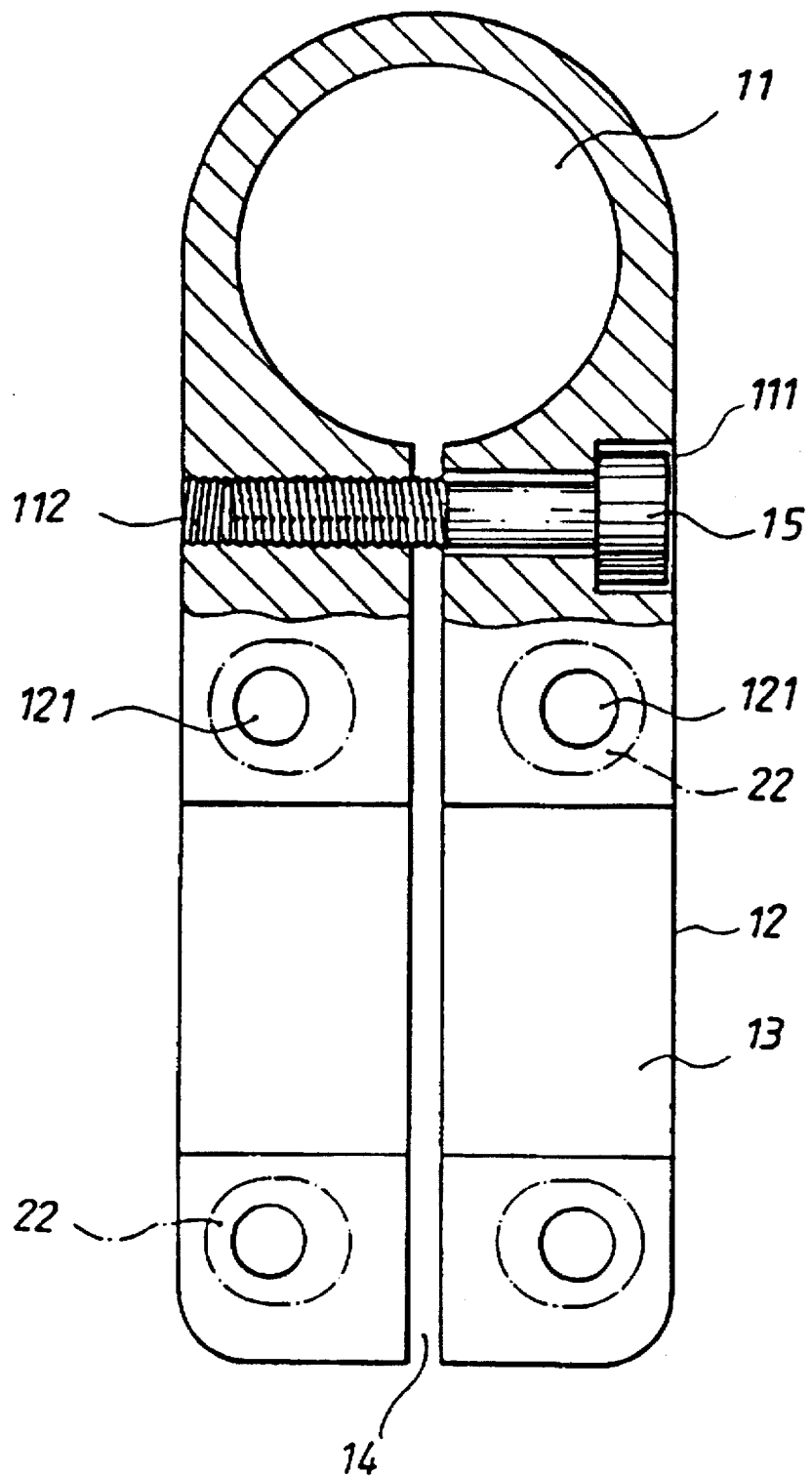
FIG. 3 is a partial cross-sectional view of the joint structure.
Figure 4:
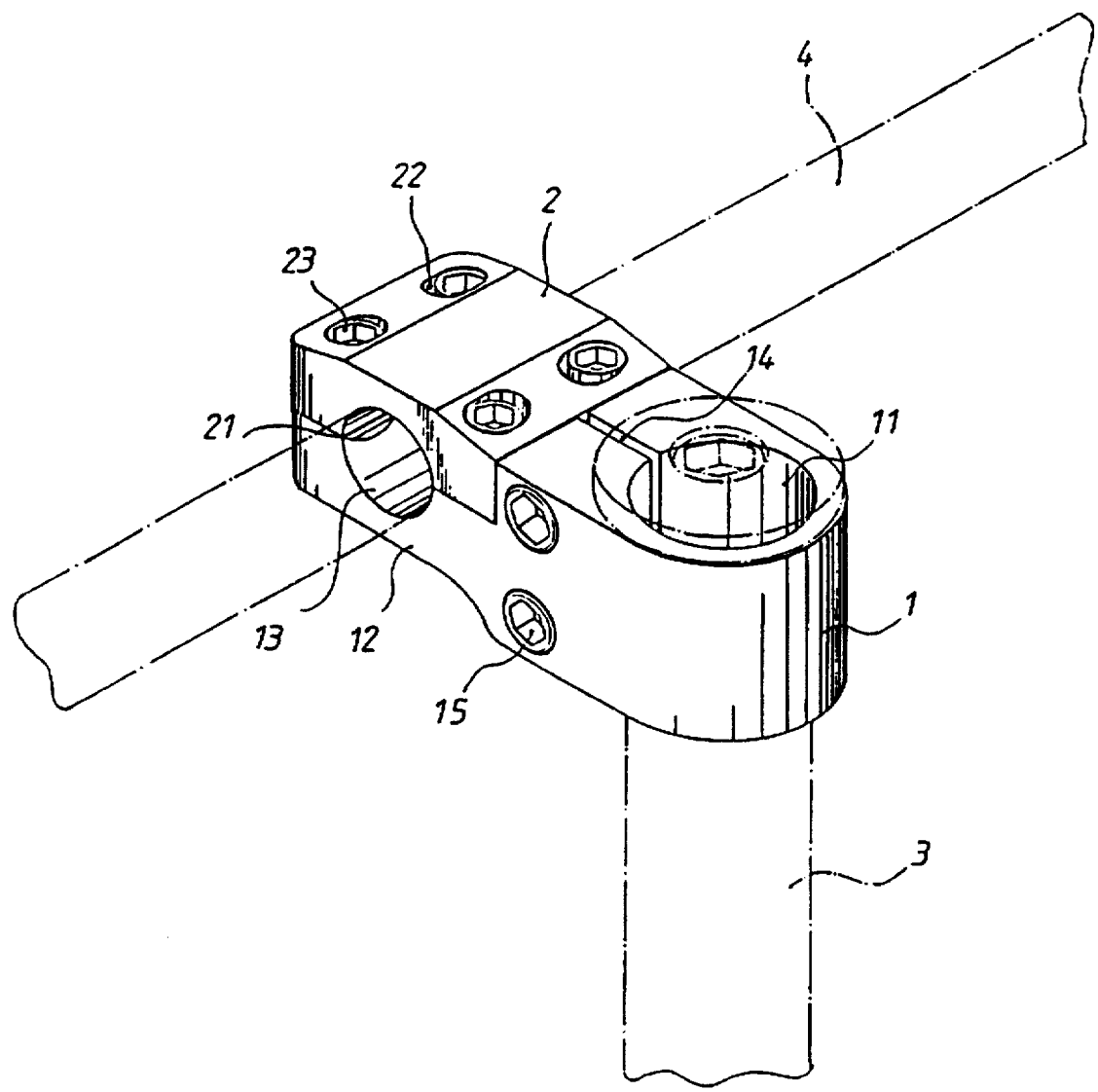
FIG. 4 is a perspective view showing the joint structure fastening a handlebar stem and a handlebar.

The joint seat 1 is in the form of a block, one end of which has a handlebar stem joint hole 11, and the other end of which has an extension part 12. There is a half-cylindrical groove 13 on the extension part 12. As shown in FIG. 3, there are two corresponding sets of step holes 111 and inner bolt holes 112 on two side facial walls of the handlebar stem joint hole 11. Four corners on the facial ends of the half-circular groove 13 are each provided with a bolt hole 121. A longitudinal open slot 14 extends through the inner wall of the handlebar stem joint hole 11 along the direction of the half-circular groove 13 on the extension part 12 to form a continuous open slot 14.

The upper cap 2 covers the extension part 12 of the joint seat 1. The lower end of the upper cap is provided with a half-cylindrical groove 21. The surface of each of the four corners of the upper cap is provided with an elliptical hole 22. The upper cap 2 covers the extension part 12 of the joint seat 1 in order that the half-circular groove 21 of the upper cap and the half-circular groove 13 can collectively form a joint hole to receive and fasten the handlebar.

In assembling the joints, the handlebar stem 3 is first put into the joint seat 1. Two bolts 15 are inserted into the step holes 111 and threadedly engaged through their corresponding inner bolt holes 112. Because the longitudinal open slot 14 separates the extension part 12 on the joint seat 1 to form a C-shaped open groove, the bolts 15 are screwed tightly to fasten the handlebar stem 3 securely in joint hole 11. The upper cap 2 covers the extension part 12 on the joint seat 1. Screw bolts 23 extend through the elliptical holes 22 to engage the bolt holes 121 of the extension part 12 in order to fasten the handlebar 4 securely.

The longitudinal open slot 14 of the joint seat 1 extends through the handlebar stem joint hole 11 and the extension part 12. Therefore, the open slot 14 may be contracted to fasten the handlebar stem securely by screwing two bolts 15 onto the side walls of the handlebar stem joint hole 11. This joint is simple and fast and ensures a secure fastening of the parts. Because the longitudinal open slot 14 of the extension part 12 is slightly contracted, the bolt holes 121 on both sides of the extension part 12 will inherently be capable of slight relative movement. However, the elliptical holes 22 of the upper cap 2 enough the relative movement of the bolt holes 121, so that screw bolts 23 may be quickly and easily engaged and without difficulty in alignment.

Above all, the structure of the joint of the present invention is quite simple. Especially, the longitudinal open slot of the joint seat and the elliptical holes of the upper cap provide a practical and novel improvement. However, the disclosed embodiment is only a representative form of the invention. Those skilled in the art may furthermore generate some changes. For example, the handlebar stem joint hole of the joint seat can combine the handlebar stem into an inverted L-shaped handlebar stem body. Furthermore, the height difference between the joint seat and the extension part of the mentioned embodiment provides cosmetic appeal and may be varied.

I claim:

1. A joint structure for securing a handlebar stem and a handlebar of a bicycle together, which joint structure comprises:

a) a joint seat including a first end and a second end, the first end having a first joint hole formed therethrough for receiving a handlebar stem, the second end defining an extension part having a first half-cylindrical groove formed therein, a pair of step holes and a pair of threaded holes extending through the first end for receiving a plurality of first threaded fasteners to tighten the first joint hole around the handlebar stem, and a plurality of second threaded holes formed in the extension part;

b) an upper cap including a plurality of elliptical holes and a second half-cylindrical groove formed therein, the first and second half-cylindrical grooves collectively forming a second joint hole for receiving a handlebar, the elliptical holes corresponding in number and alignment with the second threaded holes for receiving a plurality of threaded fasteners and clamping the handlebar in the second joint hole; and c) wherein threaded engagement of the first fasteners causes contraction of the slot for damping the handlebar stem in the first joint hole and the elliptical holes permit alignment of the second threaded fasteners for engagement with the second threaded holes during contraction of the slot.

* * * * *